US012377691B2

(12) United States Patent
Gander et al.

(10) Patent No.: US 12,377,691 B2
(45) Date of Patent: Aug. 5, 2025

(54) TIRE HAVING OPTIMIZED PERFORMANCE IN TERMS OF ROLLING RESISTANCE WITHOUT IMPAIRING THE INDUSTRIAL PERFORMANCE

(71) Applicant: COMPAGNIE GENERALE DES ETABLISSEMENTS MICHELIN, Clermont-Ferrand (FR)

(72) Inventors: Sophie Gander, Clermont-Ferrand (FR); Gael Roty, Clermont-Ferrand (FR); Herve Ferigo, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 18/567,240

(22) PCT Filed: May 23, 2022

(86) PCT No.: PCT/FR2022/050973
§ 371 (c)(1),
(2) Date: Dec. 5, 2023

(87) PCT Pub. No.: WO2022/258902
PCT Pub. Date: Dec. 15, 2022

(65) Prior Publication Data
US 2024/0270026 A1    Aug. 15, 2024

(30) Foreign Application Priority Data

Jun. 7, 2021   (FR) ...................................... 2105984

(51) Int. Cl.
*B60C 13/00* (2006.01)
*B60C 1/00* (2006.01)
(Continued)

(52) U.S. Cl.
CPC ........ *B60C 15/0603* (2013.01); *B60C 1/0025* (2013.01); *B60C 15/0009* (2013.01);
(Continued)

(58) Field of Classification Search
CPC .... B60C 13/00; B60C 13/04; B60C 2013/045
See application file for complete search history.

(56) References Cited

U.S. PATENT DOCUMENTS

2007/0029022 A1   2/2007  Tanaka et al.
2015/0183277 A1   7/2015  Bourgeois
(Continued)

FOREIGN PATENT DOCUMENTS

DE     112016000956 T5    11/2017
EP          1640188 A1     3/2006
(Continued)

OTHER PUBLICATIONS

International Search Report dated Jul. 24, 2022, in corresponding PCT/FR2022/050973 (4 pages).

*Primary Examiner* — Kendra Ly
(74) *Attorney, Agent, or Firm* — VENABLE LLP

(57) ABSTRACT

The rolling resistance of a tire has been improved without degrading industrial performance. The sidewall (30) consists of two sub-layers. A first sub-layer (FE1) of thickness E1 and volume V1 provides the expected protection functions of a sidewall as the outer wall of the tire, and a second sub-layer of the sidewall (FE2) of thickness E2 and volume V2 is optimized at low hysteresis to improve rolling resistance. The ratio V1/(V1+V2) of the volumes of the two sub-layers (FE1, FE2) is less than or equal to 0.3. The elongation at break of the compound of FE1 is greater than or equal to 200% measured at a temperature of 100° C., and the viscoelastic loss of the compound of FE2, Tan(δ)max, is less than or equal to 0.10.

15 Claims, 2 Drawing Sheets

(51) Int. Cl.
  *B60C 15/00*    (2006.01)
  *B60C 15/024*   (2006.01)
  *B60C 15/06*    (2006.01)
  *B60C 13/04*    (2006.01)

(52) U.S. Cl.
  CPC ........ *B60C 15/024* (2013.01); *B60C 15/0628* (2013.01); *B60C 2013/005* (2013.01); *B60C 2013/006* (2013.01); *B60C 2013/007* (2013.01); *B60C 2013/045* (2013.01); *B60C 2015/061* (2013.01); *B60C 2015/0621* (2013.01)

(56) References Cited

U.S. PATENT DOCUMENTS

2018/0244112 A1* 8/2018 Sakai ................. C08K 5/23
2024/0253396 A1  8/2024 Gander et al.

FOREIGN PATENT DOCUMENTS

| EP | 2657049 A1 | 10/2013 |
| FR | 2994127 A1 | 2/2014 |
| JP | 2006-62379 A | 3/2006 |
| WO | 2010/072736 A1 | 7/2010 |

\* cited by examiner

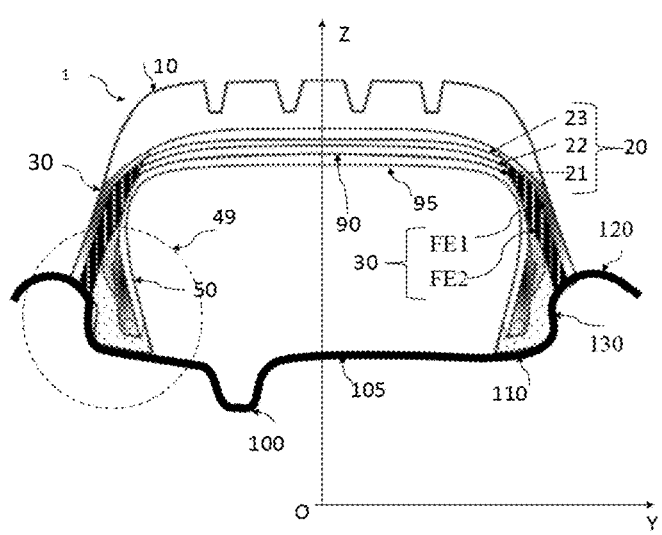
Figure 1-A
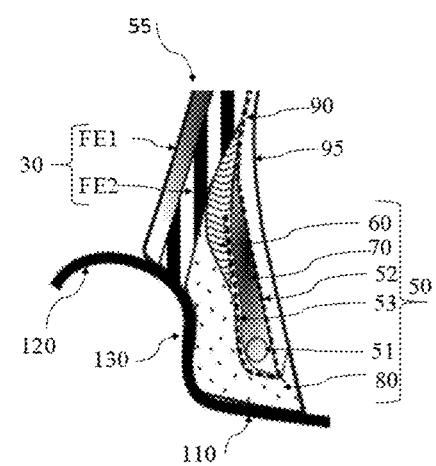
Figure 1-B
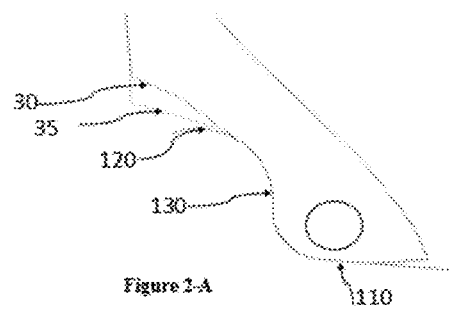
Figure 2-A
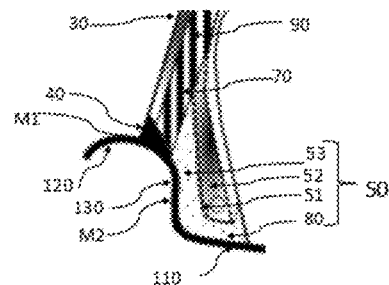
Figure 2-C
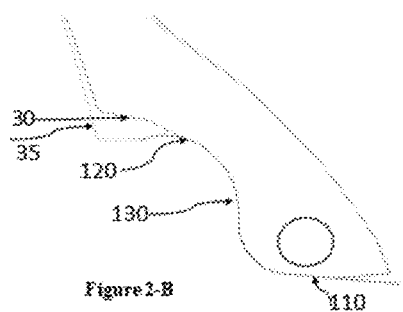
Figure 2-B
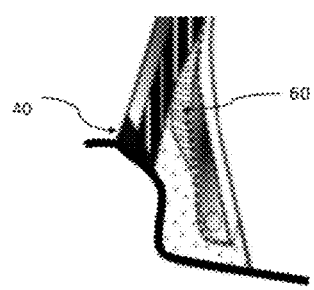
Figure 2-D

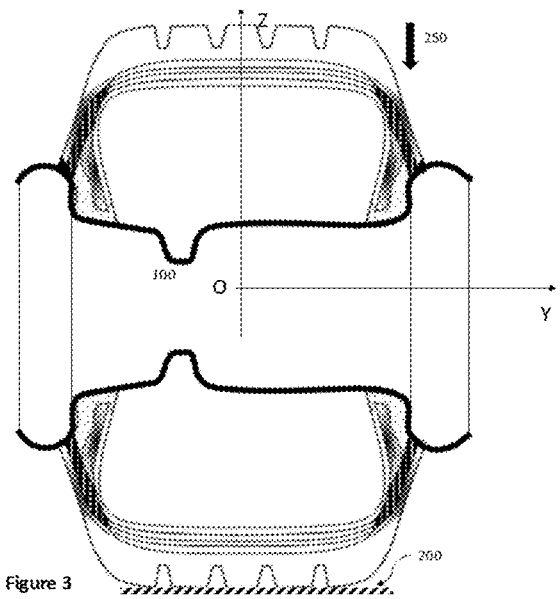
Figure 3
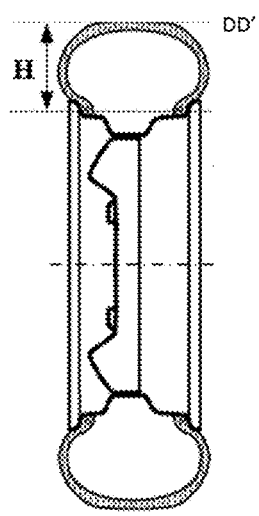
Figure 4-A
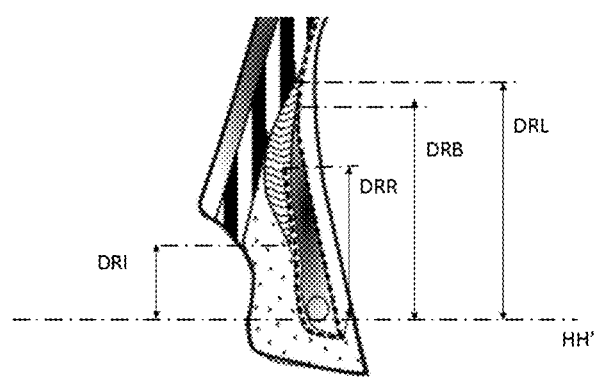
Figure 4-B

TIRE HAVING OPTIMIZED PERFORMANCE IN TERMS OF ROLLING RESISTANCE WITHOUT IMPAIRING THE INDUSTRIAL PERFORMANCE

FIELD OF THE INVENTION

The present invention relates to a tyre for a motor vehicle whose rolling resistance performance is improved without degrading the industrial performance of its manufacture. The invention is more particularly suited to a radial tyre intended to be fitted to a passenger vehicle or van.

Definitions

By convention, a frame of reference (O, OX, OY, OZ) is considered, the centre O of which coincides with the centre of the tyre, the circumferential direction OX, the axial direction OY and the radial direction OZ respectively designate a direction tangent to the running surface of the tyre according to the direction of rotation, a direction parallel to the axis of rotation of the tyre, and a direction orthogonal to the axis of rotation of the tyre.

Radially inner or radially outer means closer to or further from the axis of rotation of the tyre, respectively.

Axially inner or axially outer means closer to or further from the equatorial plane of the tyre, respectively, the equatorial plane of the tyre being the plane passing through the centre of the tyre tread and perpendicular to the axis of rotation of the tyre.

The constitution of the tyre is usually described by a representation of its constituents in a meridian plane, i.e. a plane containing the axis of rotation of the tyre.

A tyre comprises a crown, intended to come into contact with the ground via a tread, the two axial ends of which are connected by means of two sidewalls to two beads ensuring the mechanical connection between the tyre and the rim on which it is intended to be mounted.

A radial tyre further comprises a reinforcement, consisting of a crown reinforcement, radially inner to the tread, and a carcass reinforcement, radially inner to the crown reinforcement.

The crown reinforcement of a radial tyre comprises a superposition of circumferentially extending crown layers radially outside the carcass reinforcement. Each crown layer consists of reinforcers that are parallel to one another and coated in a polymer material of the elastomer or elastomer compound type. The assembly consisting of the crown reinforcement and the tread is called the crown.

The carcass reinforcement of a radial tyre usually comprises at least one carcass layer consisting of metallic or textile reinforcing elements coated in an elastomeric coating compound. The reinforcing elements are substantially parallel to one another and form an angle of between 85° and 95° with the circumferential direction. The carcass layer comprises a main part, connecting the two beads together and winding, in each bead, around an annular reinforcement structure. The annular reinforcement structure may be a bead wire which comprises a circumferential reinforcement element, most often metallic, surrounded by at least one material which, in a non-exhaustive manner, is an elastomeric or textile material. The winding of the carcass layer around the annular structure runs from the inside to the outside of the tyre to form a turn-up, comprising one end. The turn-up, in each bead, allows the carcass reinforcement layer to be anchored to the annular structure of the bead.

Each bead comprises a filling layer extending the annular reinforcing structure radially outwards. The filling layer consists of at least one elastomeric filling compound. The filling layer axially separates the main part and the turn-up of the carcass reinforcement.

Each bead also comprises a protective layer extending the sidewall radially inwards and axially outside the turn-up. The protective layer is also at least partially in contact, via its axially outer face, with a flange of the rim. The protective layer consists of at least one protective elastomeric compound.

Each bead may finally comprise a lateral reinforcement layer positioned between the sidewall and the turn-up of the carcass reinforcement. The outer lateral reinforcement layer consists of at least one elastomer compound.

Each sidewall of a tyre comprises at least one sidewall layer made of an elastomer compound and extending axially towards the inside of the tyre from an outer face of the tyre in contact with atmospheric air.

The term "elastomer compound" is understood to mean an elastomeric material obtained by mixing its various constituents. An elastomer compound conventionally comprises an elastomer matrix with at least one diene elastomer of the natural or synthetic rubber type, at least one reinforcing filler of the carbon black type and/or of the silica type, a cross-linking system that is usually sulphur-based, and protective agents. For some applications, the elastomers in question can also comprise thermoplastics (TPE).

The expression composition "based on" is understood to mean a composition comprising the compound and/or the reaction product of the various constituents used, some of these basic constituents being able to, or intended to, react with one another, at least in part, during the various phases of manufacture of the composition, in particular during its crosslinking or vulcanization.

The expression "part by weight per hundred parts by weight of elastomer" (or phr) is understood to mean, for the purposes of the present invention, the proportion by weight per hundred parts of elastomer present in the compound composition in question.

An elastomer compound can be characterized mechanically, in particular after curing, by its dynamic properties, such as a dynamic shear modulus $G^* = (G'^2 + G''^2)^{1/2}$, where $G'$ is the elastic shear modulus and $G''$ is the viscous shear modulus, and a dynamic loss $\tan \delta = G''/G'$. The dynamic shear modulus $G^*$ and the dynamic loss $\tan \delta$ are measured on a Metravib VA4000 viscosity analyser in accordance with ASTM D 5992-96. The response of a sample of vulcanized elastomer compound in the form of a cylindrical test specimen 2 mm thick and 78 mm² in cross section, subjected to sinusoidal loading in simple alternating shear stress at a frequency of 10 Hz, at a temperature of 100° C. is recorded. A sweep is carried out in deformation amplitude from 0.1% to 50% (outward cycle), then from 50% to 0.1% (return cycle). For the outward cycle, the maximum value of $\tan(\delta)$ observed, denoted $\tan(\delta)_{max}$, is indicated.

The "handling" performance corresponds to the responses of a vehicle/tyre assembly to multiple driver inputs (steering, acceleration, braking, etc.). The handling is both essential in terms of safety for the stability of the vehicle but also for driving pleasure.

The tyre plays a key role in handling because it ensures, at the end of the chain, the transmission of forces between the vehicle and the ground in order to maintain the trajectory defined by the driver.

When cornering, in order for the vehicle to remain on a trajectory, a force equivalent (but in the opposite direction)

to the centrifugal force tending to eject the vehicle from the trajectory must be generated. This lateral force must be generated by the 4 tyres of the vehicle to overcome the centrifugal force.

The deformation of the blocks of rubber in contact with the ground generates a lateral force. The mechanism allowing the tyre to deform the blocks of rubber during cornering is slip. Slip is the angle between the wheel direction and the trajectory followed by the vehicle. When cornering, this angle is not zero in order to allow the tyre to deform the rubber blocks of the tread and thus generate the necessary lateral forces.

The variation in the transverse forces generated in the contact area of the moving tyre compressed by the load carried, as a function of the slip angle applied to the tyre, is called transverse slip stiffness. The transverse slip stiffness is expressed in Newton per degree (N/°).

For small slip angles, i.e. angles less than 10°, the transverse force, in a direction parallel to the axis of rotation of the tyre, is proportional to the slip angle. The transverse slip stiffness is equal to this coefficient of proportionality.

The transverse slip stiffness is an essential physical parameter that connects the tyre to the vehicle and determines the quality of the handling of the vehicle on the road.

Rolling resistance is another performance addressed in the application. Rolling resistance is one of the forces that oppose the progress of the vehicle. The rolling resistance coefficient of a tyre ($C_{RR}$) is the rolling resistance force related to the load carried by the tyre. The coefficient is expressed in kg/t.

The rolling resistance is essentially related to the deformation of the tyre. By way of illustration, the beads associated with the sidewalls represent 20% to 30% of the rolling resistance of the tyre, while the tread contributes 60% to 80%.

Most often in this present patent application, the tyre appears to be mounted on a rim. Said rim is chosen according to the specifications of the ETRTO (European Tyre and Rim Technical Organisation) standard which assigns recommended rims to a given tyre size. In general, multiple rim widths can be suitable for one and the same tyre size. The part of the rim which interacts with the tyre within the scope of the invention is axisymmetric with respect to the axis of rotation of the tyre. To describe the rim, it is sufficient to describe the generator profile in a meridian plane.

In a meridian plane, the rim comprises at least one flange situated at an axial end, and connected to a seat which is intended to receive a face of the bead situated radially innermost. A rectilinear portion that connects the rim flange to the seat via fillets is located between the seat and the flange. The flange of the rim extended by the rectilinear portion axially limits the movement of the beads during inflation.

The mountability of the beads on a rim during inflation is also a performance that can be impacted by the invention. Bead mountability performance consists of evaluating the ability of the beads of a tyre to fit correctly on a rim during inflation. On the radially innermost face of the bead, contact with the seat must be sufficient to prevent any leakage of the tyre inflation air. In general, a contact pressure of at least 1.4 MPa is expected in this contact area. The inflation pressure traps the bead against the flange of the rim. Again, the contact pressure on the flange must be sufficient to avoid the tyre coming off the rim, in particular during tight cornering at high speed. Means, in particular radiographic means, for observing the beads mounted on a rim make it possible to diagnose the mounting quality.

It is therefore possible to classify two tyres with respect to their rim mountability performance.

Prior Art

Reducing greenhouse gas emissions from transportation is one of the major challenges facing vehicle manufacturers today. The tyre is an important source of progress, by lowering the rolling resistance, as this has a direct impact on the fuel consumption of the vehicle. As an illustration, a 20% reduction in the rolling resistance of a tyre saves about 3% of fuel per 100 km in a combined cycle.

There is still a need to reduce the rolling resistance of passenger vehicle tyres without thereby degrading the other performance levels and including industrial performance.

It has already been proposed to improve the rolling resistance of tyres for passenger vehicles by optimizing their beads. Document WO 2010/072736 teaches in particular the use of elastomeric compositions having low elastic moduli of shear stiffness G' around 15 MPa and viscous moduli G" less than the elastic moduli of shear stiffness by more than 20% in order to obtain a significant reduction in rolling resistance.

This document also recommends still further reducing the rolling resistance by optimizing the geometry of the layers of elastomer compound whose elastic and viscous moduli satisfy the above relationship. This optimization leads to profiles of layers of elastomer compounds that are shorter and wider than in conventional tyres. In some cases, the difficulty of industrial processing in order to manufacture these compound layer profiles is a major drawback of this approach.

Document FR2994127 describes an improvement of document WO 2010/072736, by proposing to add a reinforcement in the beads. The reinforcement is formed of reinforcers coated in an elastomer compound.

The major drawback of this solution is a significant degradation of the industrial cost with the introduction of new semi-finished products in the tyre manufacturing process.

Other documents such as Patent EP2657049B1 suggest lowering the hysteresis of the sidewall layer to gain rolling resistance by providing the sidewall layer with an appropriate chemical composition.

The sidewall layer performs several functions of the tyre. The outer wall of the tyre in contact with the ambient air, the sidewall layer must be resistant to attack by the ozone contained therein. In urban driving, the sidewall layer must resist contact with pavements, which sometimes results in grating of the outer surface of the sidewall leading to premature wear.

The decrease in rolling resistance by the decrease in hysteresis of the elastomer compound of the sidewall layer assumes a chemical composition significantly different from the usual compositions of this station. Often, the search for a performance compromise between rolling resistance and other sidewall layer performance results in elastomer compounds whose use in industrial manufacturing degrades industrial performance.

Industrial performance refers to the ability of processes to produce a given volume of products while meeting quality, cost and time requirements. Here the costs are related to the material loss due to the scrap of quality defects. Since the invention covers equivalent processes, only the material cost is considered in the industrial performance.

One of the steps in the manufacture of a tyre consists of a moulding phase in a curing mould. The tyre blank after the assembly of its constituents is placed in a closed hot mould, and a membrane positioned inside the mould and filled with a hot fluid deploys to press said tyre against the inner walls of the mould so as to print the tread pattern on the tread and the markings on the sidewalls.

Among the markings are markings indicating technical information on the use of the product, commercial information and regulatory information. Regulatory information is mandatory and must meet specific requirements regarding font, and size of the characters.

Tyres that have defects in regulatory markings are discarded, if they are not repairable, which increases material loss and degrades industrial performance.

The inventors have set themselves the objective of producing a tyre which improves the level of rolling resistance without degrading industrial performance.

SUMMARY OF THE INVENTION

This aim was achieved by a passenger vehicle tyre comprising in a meridian plane:
  two beads intended to be mounted on a rim, two sidewall layers connected to the beads, a crown comprising a tread, the crown having a first side connected to the radially outer end of one of the two sidewall layers and having a second side connected to the radially outer end of the other of the two sidewall layers;
  at least one carcass reinforcement extending from the two beads to the crown, the carcass reinforcement comprising a plurality of carcass reinforcement elements and being anchored in the two beads by a turn-up around an annular reinforcement structure, so as to form in each bead a main part and a turn-up;
  each sidewall layer consisting of two axially superposed sub-layers, a first sidewall sub-layer FE1 delimited by a first axially outermost side constituting a lateral wall of the tyre in contact with the ambient air, and a second axially inner side defined in such a way that said sidewall sub-layer FE1 has an average axial thickness E1, and occupying a volume V1;
  each sidewall layer also comprising a second sidewall sub-layer FE2, a first side of which coincides with the second side of the first sidewall sub-layer FE1, and a second, axially inner side of which is at least partially in contact with the carcass reinforcement, said sidewall sub-layer FE2 having an average thickness E2, and occupying a volume V2;
  the thickness E1 of the first sidewall sub-layer FE1 is greater than or equal to 0.7 mm; the ratio V1/(V1+V2) is less than or equal to 0.3;
  the elongation at break of the elastomer compound constituting the first sidewall sub-layer FE1 is greater than or equal to 200% measured at a temperature of 100° C.;
  the viscoelastic loss of the second sidewall sub-layer FE2, Tan($\delta$)max, is less than or equal to 0.10.

The principle of the invention is to lower the hysteresis of the sidewall layer in order to lower the rolling resistance of the tyre without degrading the other performance levels, in particular the industrial performance. For this purpose, the functions of the sidewall are decoupled, considering the sidewall layer as being a laminate provided with two superposed sub-layers in the axial direction.

The average thickness E2 of the sub-layer FE2 is the average of the thicknesses measured along a straight line normal to the carcass reinforcement between a first and a second point at the intersections of said normal straight line and each of the first and second sides of said sub-layer FE2. The average thickness E1 of the sub-layer FE1 is defined equivalently.

The second sub-layer FE2 occupies the largest volume of elastomer compound among the two sub-layers. According to the invention, the volume V1 of the sub-layer FE1 is less than or equal to 30% of the total volume of the sidewall. By way of illustration, for a passenger vehicle tyre dimension, 245/45 R18, at an ordinate corresponding to the middle of the sidewall layer in the meridian reference frame, E2 is 1.2 mm and E1 is 0.7 mm.

The viscoelastic loss of the compound of the sidewall sub-layer FE2, Tan($\delta$)max, is less than or equal to 0.10. This hysteresis condition imposed on the second sub-layer is motivated to improve rolling resistance.

The first sub-layer FE1 is intended to be in contact with the curing mould of the tyre during the moulding phase. The inventors have established a relationship between the ability of the first sub-layer FE1 to be demoulded without moulding defects, and the value of the elongation at break when hot of said sub-layer. According to the invention, the elongation at break of the elastomer compound constituting the first sidewall sub-layer FE1 is greater than or equal to 200% measured at a temperature of 100° C.

A thickness E1 of the first sidewall sub-layer defined by a value in millimetres around 0.7 mm guarantees correct operation without premature wear of the sidewalls of the tyre.

The combination of the choice of a sidewall layer in two sub-layers FE1, FE2, with a first sub-layer significantly smaller in thickness with appropriate mechanical properties at break, and a second sidewall sub-layer of low hysteresis, leads to the tyre of the invention which provides an improvement in rolling resistance without thereby degrading industrial performance.

The invention provides other advantages: the first sub-layer FE1 which is in contact with the ambient environment is designed to also ensure the mechanical and chemical protection functions against attack by the ambient environment.

Chemical attack of the sidewalls is understood to mean the effects of their prolonged exposure to sunlight, in particular the UV (ultraviolet) component of the light spectrum. UV light has an effect on the cleavage of the main polymer chain, leading to rapid degradation of the elastomer. This degradation manifests itself in the form of cracks on the surface, often called cracking, and can let in water which washes the soluble components and which leads to the rupture of the bonds of the products.

In order to cope with this problem, the inventors have incorporated UV chemical stabilizers into the formulation of the sidewall sub-layer FE1: carbon black is generally recognized as being one of the most effective UV protection systems to be used for elastomers. Similarly, ozone (a strong oxidant) can degrade elastomer components in the same way as UV. The inventors have solved this problem by using an antioxidant and by choosing elastomers (saturated polymers) wisely.

Advantageously, from a process point of view, the two sidewall sub-layers (FE1, FE2) are manufactured by a co-extrusion process. The co-extrusion techniques are now well mastered and make it possible to maintain identical manufacturing cycle times compared with a single-layer sidewall.

Various embodiments are proposed by the inventors in order in particular to guarantee for the tyre of the invention a level of transverse slip stiffness sufficient for good handling of the vehicle equipped with these tyres.

Advantageously, the elastic shear modulus of the second sidewall sub-layer FE2 is preferably in the range [1.5; 10] MPa and even more preferably is in the range [2.5; 10] MPa.

By assigning to the second sidewall sub-layer FE2 of a tyre of the invention an elastomer compound with an elastic shear modulus of up to 10 MPa, the transverse slip stiffness is improved compared with conventional designs, which is useful for good handling of a vehicle equipped with these tyres. The usual design of the sidewalls aims for an elastic shear modulus less than or equal to 1.5 MPa.

Moreover, the beads of the tyres of the invention are based in particular on an equilibrium between the shear stiffnesses and the hysteresis of the elastomer compounds constituting them. The elastic shear modulus G' of each sidewall sub-layer FE2 remains less than 10 MPa so that the hysteresis remains at a level measured by a Tan($\delta$)max value less than or equal to 0.10. The invention operates on the basis of an elastic shear modulus of the sidewall layer greater than or equal to 1.5 MPa.

According to a preferred embodiment, each bead comprising a filling layer comprised at least in part between the main part of the carcass reinforcement, the turn-up of the carcass reinforcement and the radially outer portion of the annular reinforcement structure, the elastomer compound constituting the filling layer has a viscoelastic loss Tan($\delta$) max of less than or equal to 0.1.

The increase in the elastic shear modulus of the elastomer compound of the sidewall sub-layer FE2 makes it possible to lower the hysteresis of the filling layer. In the usual designs of beads, the person skilled in the art chooses filling layers having an elastic shear modulus rather around 40 MPa, and the viscoelastic loss is thereby penalized.

The filling layer of the bead generally occupies a large volume and undergoes strong shear deformations due to variations in tension in the reinforcers of the main part of the carcass layer and its turn-up. The choice of an elastomer compound of low hysteresis contributes to controlling the level of viscoelastic dissipation.

Advantageously, the bead comprises a lateral reinforcement layer constituted by an elastomer compound occupying a volume comprised at least in part between the second sidewall layer and the turn-up of the carcass reinforcement.

According to the inventors, the lateral reinforcement layer of the bead complements the first filling layer to provide transverse stiffness. Depending on these material properties in terms of Tan($\delta$)max and dynamic shear stiffness, said reinforcement allows the balance of performance between rolling resistance and handling to be adjusted.

Advantageously, in a variant of this embodiment, said lateral reinforcement layer of at least one bead is constituted by an elastomer compound whose viscoelastic loss Tan($\delta$) max is less than or equal to 0.10.

In this variant of the embodiment, the two layers of compounds, namely the filling layer and the lateral reinforcing layer, verify the property of having a viscoelastic loss Tan($\delta$)max of less than 0.10. The improvement in rolling resistance is optimum, while the handling of the tyre mounted on a vehicle remains as expected.

In another embodiment of the invention, in each bead a rim contact curve comprises the points of the tyre in contact with the rim. Said rim contact curve connects a first point M1 of the tyre that is positioned axially outermost, and in contact with the rim, and a second point M2 of the tyre that is also in contact with the rim and is located in the middle of the rectilinear portion connecting the flange to the seat of the rim. The length of said rim contact curve is the curvilinear distance from point M1 to point M2 along the contact curve. Said tyre also comprises two sections in a vertical meridian section of the inflated tyre, mounted on a rim, and compressed against the ground by a vertical load, where the load, the inflation pressure, are determined in a specification standard such as ETRTO (European Tyre and Rim Technical Organisation); a first section being located in the contact area and a second section being located on the opposite side to the previous section in relation to the axis of rotation of the tyre. In the first section located in the contact area, in at least a first bead, the length of the rim contact curve, LADC, is measured. In the second section located opposite the contact area in relation to the axis of rotation of the tyre, in at least a second bead, the length of the rim contact curve, LCJ, is measured, then the ratio of the difference in the lengths of the rim contact curves of the two sections, i.e. 100*(LADC−LCJ)/LCJ, is greater than or equal to 30%.

In this embodiment, the rate of variation of rim contact of the tyres of the invention is markedly greater than that observed on the tyres of the prior art.

When the inflated tyre, mounted on a rim, is compressed by a carried load, the points of the tyre in contact with the rim may vary from one meridian to the other. It follows that the length of the rim contact curve as defined above also varies from one meridian to the other.

The tyre is designed so that the rim contact curve is as long as possible in the contact area, compared with prior art tyres, and more precisely in the meridian at the centre of the contact area. In these conditions, the inventors believe that the contribution of the rim contact to the slip stiffness is at its greatest.

In a meridian section of an inflated tyre, mounted on a rim, and compressed by the load carried, a first section of the tyre can be seen passing through the centre of the contact area. Contact area means all the points of the tyre at a given moment which are in contact with the compressing ground. The point of the contact area located on the vertical axis OZ is called the centre of the contact area. It is also possible to see, opposite the contact area with respect to the axis of rotation OY of the tyre, another section of the tyre which overall defines a deformed state comparable to the state of axisymmetric inflation.

The rate of variation of the rim contact corresponds to the maximum value of the change in the rim contact lengths per wheel revolution.

According to the inventors, an essential step in the design of a tyre of this embodiment consists in modifying its external profile in the area of contact with the rim. Various solutions are possible, such as increasing the axial thickness of the sidewall layer at the junction with the protective layer. Other solutions consist in modifying the outer profile so as to obtain a profile in the contact area with the same curvature as the rim flange. Yet another solution consists in inserting a cushion of compound in the area at the join between the sidewall layer and protective layer, at the flange of the rim. This cushion of compound can preferably consist of the same compound as the sidewall layer, so as to retain the industrial manufacturing cost. What is expected of this cushion of elastomer compound is above all its elastic shear modulus which could advantageously be, for example, equal to that of the sidewall layer.

Advantageously, the ratio of the difference in the lengths of the rim contact curves of the two sections, i.e. 100*(LADC−LCJ)/LCJ, is greater than or equal to 40%, preferably greater than or equal to 50%, more preferably greater than or equal to 60%.

The outer profile in the area of contact with the rim can be modified so as to aim for a rate of variation of rim contact. It is therefore a lever to adjust the transverse slip stiffness in the search for a compromise of performance between rolling resistance and handling of the tyre. The transverse slip stiffness is an increasing function of the rim contact variation rate. For rim contact variation rates greater than or equal to 60%, the modification of the outer profile of the sidewall layer makes it easier to mount the bead, but excessive rates greater than 100% could inhibit the mountability.

In addition to the main features of the invention, the inventors have identified levers linked to the geometry of the bead compound layers to further optimize the performance compromise of the tyre with improved rolling resistance while having good handling.

Advantageously, the distance DRB being the radial distance from one end of the radially outer filling layer, said distance DRB is less than or equal to 50% of the radial height H of the tyre.

The height H of the tyre is the normal distance between a first straight line HH' parallel to the axis of rotation of the tyre and tangent to the radially innermost point of the annular reinforcement structure, and a second straight line AA' also parallel to the axis of rotation of the tyre and passing through the radially outermost point of the tread. The radial height H is measured on the tyre mounted on a rim and inflated to a reference pressure in accordance with the ETRTO (European Tyre and Rim Technical Organisation) specifications.

Advantageously, the distance DRI being the radial distance from a radially inner end of the lateral reinforcement layer to the straight line HH', said radial distance DRI is in the range [5%; 25%] of the radial height H of the tyre.

Advantageously again, the distance DRL being the radial distance from the radially outer end of the lateral reinforcement layer to the straight line (HH'), said radial distance DRL is greater than or equal to 25% of the radial height H of the tyre.

The lateral reinforcement layer between the sidewall and the turn-up of the carcass reinforcement contributes to the stiffness of the bead as reinforcement to the first filling layer. According to the inventors, its positioning is adjusted by the dimensions DRI and DRL so as to withstand the bending stresses and extension-compression stresses of the bead during passage in the contact area.

In an advantageous embodiment of the invention, the turn-up of the carcass reinforcement is pressed against the main part of the carcass reinforcement over its entire height radially externally.

As mentioned above, the carcass reinforcement is formed of reinforcers coated between two layers of elastomer compounds. The turn-up of the carcass reinforcement is pressed against the main part of the carcass reinforcement means that the turn-up is in contact with the main branch of the carcass reinforcement. The contact is made along a surface positioned between the two coating layers of the carcass reinforcement.

In this configuration, the volume of the first filling layer is limited to a strict minimum around the annular reinforcement structure. This configuration is very advantageous for reducing the rolling resistance of the bead.

In another embodiment, the tyre comprises a reinforcement for reinforcing the bead axially externally to the carcass reinforcement, and axially internally to the sidewall.

The reinforcement of the bead is formed of mutually parallel reinforcers coated between two layers of elastomer compounds. The addition of this semi-finished product leads to an additional manufacturing cost which must be compensated for. In order to limit the impact on the cost of such a solution, this embodiment can be combined with the turn-up of the carcass reinforcement being pressed against the main part of the carcass reinforcement.

Advantageously, the elastomer compound constituting at least one layer among the filling layer, and/or the lateral reinforcement layer, and/or the second sidewall sub-layer FE2 has a composition based on a diene elastomer, a crosslinking system, a reinforcing filler, carbon black type 550, at an overall rate of between 50 and 75 phr.

Also advantageously, the elastomer compound constituting the filling layer, the elastomer compound constituting the lateral reinforcement layer, and the elastomer compound constituting the sidewall sub-layer FE2 have the same composition.

The term "diene" elastomer (or indistinctly rubber) is understood to mean, in a known manner, an elastomer resulting at least in part (i.e., a homopolymer or a copolymer) from diene monomers, i.e. monomers bearing two carbon-carbon double bonds, whether conjugated or not. The diene elastomer used is preferably selected from the group consisting of polybutadienes (BR), natural rubber (NR), synthetic polyisoprenes (IR), butadiene-styrene copolymers (SBR), isoprene-butadiene copolymers (BIR), isoprene-styrene copolymers (SIR), butadiene-styrene-isoprene copolymers (SBIR) and compositions of these elastomers.

A preferred embodiment consists in using an "isoprene" elastomer, that is to say a homopolymer or copolymer of isoprene, in other words a diene elastomer selected from the group consisting of natural rubber (NR), synthetic polyisoprenes (IR), the various isoprene copolymers and the compositions of these elastomers.

The isoprene elastomer is preferably natural rubber or a synthetic polyisoprene of the cis-1,4 type. Among these synthetic polyisoprenes, polyisoprenes having a content (mol %) of cis-1,4 bonds greater than 90%, more preferably still greater than 98%, are preferably used. According to other preferred embodiments, the diene elastomer may consist, in whole or in part, of another diene elastomer such as, for example, an SBR elastomer (E-SBR or S-SBR) used as a blend or not with another elastomer, for example of the BR type.

The rubber composition may also comprise all or part of the additives usually used in rubber matrices intended for the manufacture of tyres, such as, for example, reinforcing fillers such as carbon black or inorganic fillers such as silica, inorganic filler coupling agents, anti-ageing agents, antioxidants, plasticizers or extension oils, whether aromatic or non-aromatic in nature (in particular very weakly aromatic or non-aromatic oils, e.g. naphthenic or paraffinic oils, with high or preferably low viscosity, MES or TDAE oils, plasticizing resins with a high Tg greater than 30° C.), agents facilitating the processing (processability) of the compositions in the raw state, tackifying resins, a crosslinking system based either on sulphur, sulphur donors and/or peroxide, accelerators, vulcanization activators or retarders, antireversion agents, methylene acceptors and donors such as for example HMT (hexamethylenetetramine) or H3M (hexamethoxymethylmelamine), reinforcing resins (such as resorcinol or bismaleimide), known adhesion promoter systems of the metal salt type, for example, in particular cobalt or nickel salts.

BRIEF DESCRIPTION OF THE DRAWINGS

Other details and advantageous features of the invention will emerge below from the description of the exemplary embodiments of the invention with reference to the figures which represent meridian views of diagrams of a tyre according to embodiments of the invention. In order to make them easier to understand, the figures are not shown to scale.

FIG. 1 comprises a view 1-A which shows a section of a tyre of the invention in a meridian plane, and a view 1-B which represents a magnification of a portion of the meridian view 1-A surrounded by a dashed circle showing the bead of a tyre of the invention.

FIGS. 2-A, 2-B, 2-C and 2-D show embodiments of the invention with modifications to the outer profile of the sidewall layers (FE1, FE2) to facilitate contact with the rim.

FIG. 3 shows a meridian section of the inflated tyre, mounted on a rim and compressed by a carried load. There can be seen a first section in the contact area and a second section opposite the contact area with respect to the axis (OY). This figure illustrates the determination of the rate of variation in contact with the rim.

FIGS. 4-A and 4-B show the visualization of the main dimensions of the bead of the tyre.

DETAILED DESCRIPTION OF THE INVENTION

The invention was implemented on a passenger vehicle tyre of size 245/45R18, according to the ETRTO (European Tyre and Rim Technical Organisation) specification standard. Such a tyre can carry a load of 800 kilos, inflated to a pressure of 250 kPa.

In FIG. 1-A, the tyre of general reference 1 comprises a carcass reinforcement 90 consisting of reinforcers coated with rubber composition, and two beads 50 in contact with a rim 100. A zone 49 delimited by a dotted circle defines one of the two beads 50 of the tyre, a magnification of which is proposed in FIG. 1-B. The carcass reinforcement 90 is anchored in each of the beads 50. The tyre further comprises a crown reinforcement 20 comprising two working layers 21, 22 and a hooping layer 23. Each of the working layers 21 and 22 is reinforced by filamentary reinforcing elements which are parallel in each layer and crossed from one layer to the other, making angles of between 10° and 70° with the circumferential direction. The hooping layer 23 is arranged radially outside the crown reinforcement 20, this hooping layer 23 being formed of circumferentially oriented reinforcement elements wound in a spiral. A tread 10 is laid radially on the hooping layer 23; it is this tread 10 which ensures the contact of the tyre 1 with the ground. The tyre 1 depicted is a "tubeless" tyre: it comprises an "inner liner" 95 made from a rubber composition impermeable to the inflation gas, covering the inner surface of the tyre.

The sidewall layer 30 comprises two sub-layers (FE1, FE2). The first sub-layer FE1 is positioned axially externally so as to constitute the lateral wall of the tyre in contact with the ambient environment. The second sub-layer FE2 32 is in contact at least in part with the carcass reinforcement 90. In FIGS. 1-A and 1-B, the first sub-layer FE1 has a dark background, while the second sub-layer FE 2 has a hatched background.

The part of the rim 100 which interacts with the tyre in the context of the invention is axisymmetric with respect to the axis of rotation of the tyre.

In a meridian plane, the rim 100 comprises at least one flange 120 situated at an axial end, and connected to a seat 110 which is intended to receive a face of the bead situated radially innermost. A rectilinear portion 130 that connects the rim flange 120 to the seat 110 via fillets is located between the seat 110 and the flange 120. The flange 120 of the rim extended by the rectilinear portion 130 axially limits the movement of the beads during inflation.

The bead 50 comprises in part a carcass reinforcement 90 which comprises a main part 52, then winds around an annular reinforcement structure 51 to form a turn-up 53. A filling layer 70 is positioned between the main part 52 of the carcass reinforcement 90 and its turn-up 53. Depending on the embodiment, the bead 50 can comprise a lateral reinforcing layer 60, positioned axially outside the turn-up 53 and axially inside the sidewall layer 30. Axially innermost to the bead 50, a leaktight layer 95 constitutes the inner wall in contact with the internal inflation air.

Said bead 50 also comprises a protective layer 80 which is in axially external contact with a rectilinear portion 130 of the rim so as to limit the axial displacement of the bead. Said protective layer 80 also comprises a portion intended to be in contact with the rim on the rim seat 110. A sidewall layer 30 interacts with the bead 50 and forms an outer lateral wall.

FIG. 2-A shows the outer profiles of a bead 50 of a tyre according to a particular embodiment of the invention in comparison with that of a tyre of conventional design. The bead 50 is represented in a section opposite the contact area. The two profiles differ in an area at the rim flange 120. Reference 30 indicates the profile of a tyre of the prior art, and reference 35 shows the modification of the profile made on the tyre of the invention to facilitate contact with the rim 100.

In FIG. 2-B, we have the same representation as in FIG. 2-A, but the profiles are shown at the centre of the ground contact area. The tyre is in contact with the entire rim flange 120, unlike in FIG. 2-A. The rate of variation in rim contact reflects this change in the rim contact.

In another embodiment shown in FIG. 2-C, there is a cushion of elastomer compound 40 (modification located at the radially inner end of the sidewall 30), intended to be in contact with the rim flange 120. The cushion of compound 40 is delimited radially on the inside by a curve that closely follows the profile of the rim flange 120. A first side of the cushion of elastomer compound 40 has an appropriate geometric shape that anticipates contact with the curvature of the rim flange so as to closely follow the shape of the rim flange 120 upon contact, a second side of the cushion of elastomer compound extends an outer side of a sidewall in contact with the ambient air, a third side of the cushion of elastomer compound 40 is in contact with the radially inner end of the sidewall and finally a fourth side of the cushion of elastomer compound is in contact with the protective layer 80.

In FIG. 2-C, the rim contact curve extends from a first point M1 of the tyre positioned axially outermost, and in contact with the rim, and a second point M2 of the tyre also in contact with the rim and situated in the middle of the rectilinear portion connecting the flange 120 to the seat 110 of the rim. The length of this rim contact curve is the curvilinear distance from point M1 to point M2 along the rim contact curve.

FIG. 2-D is a variant of the preceding embodiment characterized by the presence of a lateral reinforcement layer 60 of the bead 50, positioned axially externally to the turn-up 53 of the carcass reinforcement 90, and axially internally to the sidewall layer 30.

FIG. 3 is a view in the vertical plane of a tyre of the invention according to a preceding embodiment. The tyre is inflated, mounted on a rim 100 and compressed by the load carried 250 against the ground 200. There can be seen a first meridian section in the contact area and a second meridian section opposite the contact area. In the first section located in the contact area, in at least a first bead, the length of the rim contact curve 100, LADC, is measured. The length of the rim contact curve, LCJ, is also measured in the second section, in at least a second bead. The ratio of the difference in the lengths of the rim contact curves of the two sections, i.e. 100*(LADC−LCJ)/LCJ, is greater than or equal to 30%, and in this case is equal to 62%.

In FIG. 4-A, the determination of the height H is illustrated. The height H of the tyre is the normal distance between a first straight line HH' parallel to the axis of rotation of the tyre and tangent to the radially innermost point of the annular reinforcement structure, and between a second straight line DD' also parallel to the axis of rotation of the tyre and passing through the radially outermost point of the tread. The radial height H is measured on the tyre mounted on a rim and inflated to a reference pressure in accordance with the ETRTO (European Tyre and Rim Technical Organisation) specifications.

FIG. 4-B shows the geometrical parameters of the bead in connection with the invention. The heights are defined from the straight line HH', which is tangent to the bead wire 51 at its radially innermost point:

DRI is the radial distance with respect to HH' from the radially inner end of the lateral reinforcement layer 60. The radial distance DRI is less than or equal to 20% of the radial height H of the tyre, and is equal to 5 mm in the example presented here;

DRL is the radial distance with respect to the straight line HH' from the radially outer end of the lateral reinforcement layer 60. The radial distance DRL is greater than or equal to 25% of the radial height H of the tyre and is equal to 38 mm in the example presented here;

DRR is the radial distance with respect to HH' from the end of the turn-up of the carcass reinforcement 90. The radial distance DRR being greater than or equal to 10% of the radial height H of the tyre and equal to 20 mm in the example presented here;

DRB is the radial distance with respect to HH' from the radially outer end of the filling layer 70, and is 28 mm in the example presented here.

Table No. 1 below gives the compositions of elastomer compounds of a tyre of the invention. The main compounds used are listed by expressing for each the main ingredients expressed in phr (part by weight per hundred parts by weight of elastomer):

TABLE 1

|    | Elastomer NR (Natural rubber) | Elastomer BR (Butadiene) | Reinforcing filler - carbon black | Antioxidant | Sulphur | Accelerator | Reinforcing resin | Hardener |
|----|---|---|---|---|---|---|---|---|
| M1 | 100 | 0 | 75 (N326) | 1.5 | 8.5 | 0.95 | 12 | 4.18 |
| M2 | 100 | 0 | 75 (N326) | 2 | 7.5 | 0.97 | 12 | 6.8 |
| M3 | 35 | 65 | 30 (N550) 10 (Silica) | 1.3 | 8.0 | 4.75 | 0 | 0 |
| M4 | 35 | 65 | 48 (N550) | 5 | 1.4 | 1.4 | 18 | 0 |

The compounds of the invention used in this example are based on natural rubber elastomer, or a blend of natural rubber and butadiene for compounds M3 and M4, reinforced with carbon black. Plasticizers (reinforcing resin) are incorporated into the composition to facilitate the processability of the compounds. The compounds also comprise vulcanization agents, sulphur, an accelerator, and protection agents.

The compound M4 which constitutes the first sidewall layer FE1 comprises an antioxidant at 5 phr and carbon black at 48 phr, so as to guarantee protection against attacks due to exposure to light and attack by ozone.

The associated mechanical and viscoelastic properties, measured at 23° C. under a deformation amplitude of 10%, are summarized in Table No. 2:

TABLE 2

|    | G' | G" | Tan(δ)max |
|----|------|-------|------|
| M1 | 46   | 7     | 0.2  |
| M2 | 48   | 8     | 0.2  |
| M3 | 2.47 | 0.06  | 0.03 |
| M4 | 1.26 | 0.100 | 0.08 |

The elastomer compound M4 has a level of elongation at break of 300% measured at 100° C., whereas the level of elongation at break of the compound M3 is 80% also measured at 100° C.

Configurations of tyres of the invention were tested to clearly highlight the performance provided by the invention. The results of these tests were compared with those obtained on control tyres.

The control T1 in accordance with FIGS. 1-A and 1-B corresponds to a tyre of conventional design which comprises a filling layer constituted by the elastomer compound M1, a lateral bead reinforcement layer constituted by the elastomer compound M2, and the two sidewall sub-layers (FE1, FE2) consisting of the elastomer compound M4. The profile of the sidewall layer is of usual design, i.e. it has not been modified to facilitate contact with the rim.

A second control T2 reprises the specifications of T1, but the elastomer compounds of the two sidewall sub-layers consist of the same compound M3.

The first tyre P1 according to the invention reprises the specifications of the control T1, but the first sidewall sub-layer FE1 is composed of the compound M4 and the second sidewall sub-layer FE2 is composed of the compound M3.

In general, all the tyres according to the invention have the first sidewall layer FE1 consisting of the compound M4, and the second sidewall layer FE2 consisting of the compound M3.

The second tyre P2 according to the invention contains a filling layer consisting of the compound M3 and also contains a lateral reinforcement layer consisting of the compound M2.

The third tyre P3 according to the invention has the filling layer and the lateral reinforcement layer consisting of the same compound M3.

Finally, the fourth tyre P4 of the invention differs from P3 by the modification of the profile of the sidewall layer for a rate of variation of rim contact greater than 30%.

The configurations of the tyres P1, P2 and P3 of the invention are illustrated in FIG. 1-B. As regards the configuration P4, the illustrations can be observed in FIGS. 2-A, 2-B and 2-D.

The rate of variation of rim contact is 62% for P4, after a partial modification of the profile of the sidewall layer in the area of contact with the rim, as shown in FIGS. 2-A and 2-B.

Industrial performance is measured according to the scrap rate for sidewall moulding defects. None of the tyres of the invention P1, P2, P3 and P4 have moulding defects affecting the markings, and are satisfactory in industrial performance like T1. On the other hand, the control T2 with a single-layer sidewall consisting of the compound M3 leads to numerous rejects due to difficult demoulding.

The rolling resistance test was carried out in accordance with ISO 28580. For a tested tyre, the result is the rolling resistance coefficient, which represents the ratio of the resistance force to the forward travel of the vehicle by hysteresis of the tyres divided by the load carried.

The transverse slip stiffness measurements were carried out on dedicated measuring machines such as, for example, those marketed by MTS.

A result above (respectively below) 100% means an improvement (respectively a degradation) of the considered performance.

The results obtained are summarized in Table No. 3 below:

TABLE 3

|    | Rolling resistance | Transverse slip stiffness |
|----|--------------------|---------------------------|
| T1 | 100                | 100                       |
| T2 | 102                | 101                       |
| P1 | 102                | 100                       |
| P2 | 104                | 100                       |
| P3 | 112                | 98                        |
| P4 | 111                | 101                       |

All the tyres of the invention achieve the desired compromise between rolling resistance and industrial performance. Rolling resistance is improved from 2% to 12% depending on the tested variants.

The transverse slip stiffness of the tyres was measured. Tyres P1 and P3 have a transverse slip stiffness of 100% and 98% respectively, without noticeably affecting the handling of the vehicle. Tyres P2 and P4 have superior or equal performance to the target sought.

All the variants of tyres according to the invention presented are produced without developing the processes and retain a usual industrial manufacturing cost.

Moreover, the invention can be generalized to other bead architectures than those described here, such as, for example, a bead having a first filling layer and a second lateral reinforcement layer, even though the carcass reinforcement does not comprise a turn-up.

The invention claimed is:

1. A tire for a passenger vehicle comprising in a meridian plane:
    two beads intended to be mounted on a rim, two sidewall layers connected to the beads, a crown comprising a tread, the crown having a first side connected to a radially outer end of one of the two sidewall layers and having a second side connected to a radially outer end of the other of the two sidewall layers; and
    at least one carcass reinforcement extending from the two beads to the crown, the at least one carcass reinforcement comprising a plurality of carcass reinforcement elements and being anchored in the two beads by a turn-up around an annular reinforcement structure, so as to form in each bead a main part and a turn-up,
    wherein each sidewall layer consists of two axially superposed sub-layers, a first sidewall sub-layer delimited by a first axially outermost side constituting a lateral wall of the tire in contact with ambient air, and a second axially inner side defined such that the sidewall sub-layer has an average axial thickness E1, and occupying a volume V1, and a second sidewall sub-layer, a first side of which coincides with the second axially inner side of the first sidewall sub-layer, and a second, axially inner side of which is at least partially in contact with the carcass reinforcement, the sidewall sub-layer having an average axial thickness E2, and occupying a volume V2,
    wherein the thickness E1 of the first sidewall sub-layer is greater than or equal to 0.7 mm,
    wherein a ratio V1/(V1+V2) is less than or equal to 0.3,
    wherein an elongation at break of an elastomer compound constituting the first sidewall sub-layer is greater than or equal to 200% measured at a temperature of 100° C., and
    wherein a viscoelastic loss of the second sidewall sub-layer, Tan(δ) max, is less than or equal to 0.10.

2. The tire according to claim 1, wherein an elastic shear modulus of the second sidewall sub-layer is in a range of 1.5 to 10 MPa.

3. The tire according to claim 1, each bead comprising a filling layer comprised at least in part between a main part of the carcass reinforcement, the turn-up of the carcass reinforcement and a radially outer portion of the annular reinforcement structure, wherein an elastomer compound constituting the filling layer has a viscoelastic loss Tan(δ) max of less than or equal to 0.1.

4. The tire according to claim 1, a distance DRB being a radial distance from a radially outer end of the filling layer to a straight line parallel to the axis of rotation of the tire and tangent to the radially innermost point of the annular reinforcement, wherein the distance DRB is less than or equal to 50% of a radial height H of the tire.

5. The tire according to claim 1, wherein the turn-up of the carcass reinforcement is pressed against the main part of the carcass reinforcement over its entire height radially externally.

6. The tire according to claim 1, wherein the tire further comprises a reinforcement of the bead axially externally to the turn-up of the carcass reinforcement, and axially internally to the sidewall.

7. The tire according to claim 1, wherein the two sidewall sub-layers are manufactured by a co-extrusion process.

8. The tire according to claim 1, in each bead a rim contact curve comprising points of the tire in contact with the rim, the rim contact curve connecting a first point M1 of the tire positioned outermost axially, and in contact with the rim, and a second point M2 of the tire in contact with the rim and situated in a middle of a rectilinear portion connecting a flange to a seat of the rim,
    the tire further comprising two sections in a vertical meridian section of the tire when inflated, mounted on a rim, and compressed against the ground by a vertical load, where the vertical load and an inflation pressure are determined in a specification standard, a first section being located in a contact area and a second section being located on an opposite side to the first section in relation to an axis of rotation of the tire, in the first section located in the contact area, in at least a first bead, a length of the rim contact curve, LADC, being measured, and in the second section located opposite the contact area in relation to the axis of rotation of the tire, in at least a second bead, a length of the rim contact curve, LCJ, being measured, wherein a ratio of difference in the lengths of the rim contact curves of the two sections, 100*(LADC−LCJ)/LCJ, is greater than or equal to 30%.

9. The tire according to claim 8, wherein the ratio of the difference in the lengths of the rim contact curves of the two sections, 100*(LADC−LCJ)/LCJ, is greater than or equal to 40%.

10. The tire according to claim 1, wherein each bead comprises a lateral reinforcement layer consisting of an elastomer compound occupying a volume comprised at least in part between the second sidewall layer and the turn-up of the carcass reinforcement.

11. The tire according to claim 10, wherein the lateral reinforcement layer of each bead consists of an elastomer compound a viscoelastic loss $Tan(\delta)max$ of which is less than or equal to 0.10.

12. The tire according to claim 10, a distance DRI being a radial distance from a radially inner end of the lateral reinforcement layer to a straight line parallel to the axis of rotation of the tire and tangent to the radially innermost point of the annular reinforcement, wherein the radial distance DRI is in a range from 5% to 20% of a radial height H of the tire.

13. The tire according to claim 10, a distance DRL being a radial distance from a radially outer end of the lateral reinforcement layer to a straight line parallel to the axis of rotation of the tire and tangent to the radially innermost point of the annular reinforcement, wherein the radial distance DRL is greater than or equal to 25% of a radial height H of the tire.

14. The tire according to claim 10, wherein an elastomer compound constituting at least one layer among the filling layer, the lateral reinforcement layer, and the sidewall sub-layer has a composition based on a diene elastomer, a crosslinking system, a reinforcing filler, and carbon black type N550, at an overall rate of between 50 and 75 phr.

15. The tire according to claim 14, wherein an elastomer compound constituting the filling layer, an elastomer compound constituting the lateral reinforcement layer, and an elastomer compound constituting the second sidewall sub-layer have the same composition.

* * * * *